US007922583B2

(12) United States Patent
Goforth et al.

(10) Patent No.: US 7,922,583 B2
(45) Date of Patent: Apr. 12, 2011

(54) DIGITAL SIGNAL PROCESSOR BASED GENERATION AND CONTROL OF ELECTRONIC SIGNALS IN A GAMING MACHINE

(75) Inventors: Todd W. Goforth, Reno, NV (US); William L. Hecht, Reno, NV (US); Michael Hoy, Reno, NV (US)

(73) Assignee: IGT, Reno, NV (US)

( * ) Notice: Subject to any disclaimer, the term of this patent is extended or adjusted under 35 U.S.C. 154(b) by 1010 days.

(21) Appl. No.: 10/635,769

(22) Filed: Aug. 5, 2003

(65) Prior Publication Data

US 2005/0032575 A1 Feb. 10, 2005

(51) Int. Cl.
*A63F 13/00* (2006.01)

(52) U.S. Cl. ........................................... 463/35; 463/42

(58) Field of Classification Search .................... 463/35, 463/31, 42
See application file for complete search history.

(56) References Cited

U.S. PATENT DOCUMENTS

| | | | | |
|---|---|---|---|---|
| 4,305,131 | A * | 12/1981 | Best | 715/716 |
| 4,445,187 | A * | 4/1984 | Best | 463/31 |
| 4,569,019 | A * | 2/1986 | DiOrio et al. | 463/31 |
| 4,695,053 | A | 9/1987 | Vazquez, Jr. et al. | 463/18 |
| 4,770,416 | A * | 9/1988 | Shimizu et al. | 463/9 |
| 4,799,144 | A * | 1/1989 | Parruck et al. | 710/2 |
| 5,136,631 | A * | 8/1992 | Einhorn et al. | 379/88.22 |
| 5,984,780 | A | 11/1999 | Takemoto et al. | 463/20 |
| 6,029,221 | A * | 2/2000 | Wu et al. | 710/305 |
| 6,237,057 | B1 * | 5/2001 | Neal et al. | 710/309 |
| 6,411,926 | B1 * | 6/2002 | Chang | 704/221 |
| 6,556,450 | B1 | 4/2003 | Rasmussen et al. | 361/754 |
| 2002/0151366 | A1 * | 10/2002 | Walker et al. | 463/42 |
| 2003/0100359 | A1 * | 5/2003 | Loose et al. | 463/20 |
| 2004/0029637 | A1 * | 2/2004 | Hein et al. | 463/35 |
| 2004/0161115 | A1 * | 8/2004 | Loose | 381/20 |

FOREIGN PATENT DOCUMENTS

| | | | |
|---|---|---|---|
| EP | 0978809 | A2 | 2/2000 |
| EP | 1039423 | A1 | 9/2000 |
| EP | 143950 | A2 | 7/2004 |
| EP | 14530216 | A2 | 9/2004 |

OTHER PUBLICATIONS

European Patent Office Combined Search and Examination Report for Application No. GB0417221,9, Dec. 23, 2004. U.S. Appl. No. 09/927,901, by LeMay et al. filed Aug. 9, 2001, and titled "Virtual Cameras and 3-D Gaming Environments in a Gaming Machine".
U.S. Appl. No. 09/689,498, by LeMay et al. filed Oct. 11, 2000, and titled "Frame Buffer Capture of Actual Game Play".
Australian Examination Report mailed Aug. 11, 2009 in Application No. 2004203615, [P095AU].

* cited by examiner

*Primary Examiner* — James S. McClellan
*Assistant Examiner* — Jeffrey Wong
(74) *Attorney, Agent, or Firm* — Weaver Austin Villeneuve & Sampson LLP

(57) ABSTRACT

An apparatus and method for generating and controlling electronic signals in a gaming machine is disclosed. The provided apparatus and method include a gaming machine having a CPU or master gaming controller and a digital sound system. The digital sound system comprises one or more speakers, at least one memory unit storing data, a digital signal processor adapted to control and generate audio output, and a programmable logic device interposed between the master gaming controller and the digital signal processor, such that the digital signal processor is unable to communicate to the master gaming controller. The programmable logic device includes at least an address decoder and an event sequencer, with the event sequencer being able to convert instructions from the master gaming controller to instructions that can be executed by the digital signal processor.

26 Claims, 3 Drawing Sheets

DIGITAL SIGNAL PROCESSOR BASED GENERATION AND CONTROL OF ELECTRONIC SIGNALS IN A GAMING MACHINE

TECHNICAL FIELD

The present invention relates generally to an apparatus and method for providing signals in an electronic device, and more specifically to an apparatus and method for generating and controlling audio signals in a gaming machine.

BACKGROUND

Modern technological advances have allowed for a wide and growing variety of increasingly sophisticated and complex electronic devices and machines. Various electronic hardware components and software modules have been devised over the years to produce devices and machines having faster processing capabilities, better video presentations, higher quality audio sound systems, and other new and upgraded primary features. One example of such a component is a Digital Signal Processor (DSP), which is generally a specialized intelligent electronic hardware component that is used to provide a given electronic device or machine with more complex and higher quality audio and video, as well as other capabilities.

DSPs and other types of specialized and powerful processing components are frequently used in a variety of electronic components and devices where better audio or video capabilities are particularly valued. DSPs can tend to be a relatively complex component, however, thereby adding cost, complexity, and potentially undesirable complications or side effects when used, such that their use is far from universal in all types of electronic devices. In fact, several types of machine manufacturers, and even industries, generally avoid the use of DSPs or similar devices due to the prohibitive costs, complexities, and/or one or more other undesirable features of these components. One such industry that has traditionally avoided DSPs, for example, is the gaming machine (i.e., slot machine) industry.

Unfortunately, a substantially higher amount of scrutiny is leveled against regulated gaming machines and proposed gaming machine designs having more than one "intelligent" electronic device in communication with any game play or payout mechanisms. That is to say, authorities and regulators in most gaming jurisdictions tend to be more objectionable or critical whenever any secondary or additional processing unit is allowed to be in communication with any vital machine function outside a single primary central processing unit (CPU) (typically known as a master gaming controller (MGC)). Such objections and reservations are generally understandable, given the exponential avenues for fraud and cheating, as well as the added regulatory requirements and oversight, that tend to be introduced with the addition of any auxiliary or secondary microprocessors in a given gaming machine. Such objections and reservations tend to be problematic, however, in that undue delay in the approval and release of newly designed gaming machines is likely in the event that such new designs are even approved in the first place. Accordingly, the design and manufacture of gaming machines has been traditionally restricted to older and more limited audio and video technologies that do not include the use of DSPs or other powerful auxiliary processors, thus rendering gaming machines in particular as an ideal illustrative example for the types of sound systems discussed herein.

The present inventors are nevertheless aware of at least one line of gaming machines that have implemented DSPs in some form, with those being gaming machines manufactured under the Williams label by WMS Gaming, Inc. of Waukegan, Ill., which gaming machines include model ADSP-21065 chips manufactured by Analog Devices Inc. of Norwood, Mass. As best understood by the present inventors, however, the DSPs in these gaming machines are used only for purposes of "data decompression," which is a narrowed and simple purpose for using a DSP, as explained in greater detail below. In addition, the present inventors are also aware that U.S. Pat. Nos. 5,984,780 and 6,556,450 refer to the possible use of a DSP within the context of a gaming machine, although any uses beyond a simple and common data decompression functionality are not mentioned by either of these two references.

Due in part to the rather restrictive atmosphere in the regulation of gaming machines, gaming machine sound and video systems tend to be relatively inflexible, and typically do not allow for the wide range of customized functions and features found in other electronic devices. Ordinary apparatuses and methods for providing, for example, audio signals in an electronic device or machine, such as a gaming machine, are generally well known, and instances of such apparatuses and methods can be found in, for example, U.S. Pat. No. 4,695,053, which is incorporated herein by reference in its entirety. It is generally known that gaming machines are typically manufactured with relatively older and simpler off-the-shelf sound circuits. While such circuits provide some level of necessary functionality, they are limited in capability, restrict future expansion, and are not readily portable from one audio standard to another. In addition, such circuits can be relatively expensive to replace when they break down or otherwise wear out.

Sources of audio data for such simpler systems typically include recorded sound clips that are stored in digitized .WAV (or "wave") sound files, which tend to require particularly large amounts of memory. Another exemplary source of audio data that is currently used in gaming machines are sounds generated by a dedicated FM operator circuit. Both of these types of sources, as well as others, generally involve the use of uncompressed data that is played back or transmitted in full without mixing, alterations or customizations. Within a gaming machine, such sound circuits and sources of audio data are traditionally controlled and commanded by a single CPU or MGC, again primarily due to industry regulations and restrictions.

It is well known to those skilled in the art that gaming machines are becoming more and more sophisticated, such that presently used sound systems are becoming too slow and/or inadequate to meet the demands and functions required of more sophisticated machines. New and expanding types of gaming machines, such as "theme" machines comprising, for example, "Wheel of Fortune" or "Elvis" types of themes, can require many different sound clips and variations on those clips. Such requirements tend to result in the need for massive amounts of memory storage in simplistic "playback" types of sound systems, with the resulting product still not performing or sounding as nice or smooth as more complex electronic sound systems that require a fraction of the memory storage space. Not only do the costs and logistics associated with providing ever increasing amounts of memory storage become more and more prohibitive with the increasing complexity of the newer gaming machines, but the sound quality and functionality continues to lag behind that of other electronic devices and machines as well.

Accordingly, there exists a need for improved apparatuses and methods for generating and controlling electronic signals in an electronic device, and in particular for such apparatuses and methods to provide ways of actually fully utilizing a DSP or other powerful auxiliary processor in a gaming machine.

SUMMARY

It is an advantage of the present invention to provide improved apparatuses and methods for generating and controlling electronic signals in a gaming machine. According to one embodiment of the present invention, the provided apparatus and method involve the use of Digital Signal Processor (DSP). This is accomplished by interposing a Programmable Logic Device (PLD) between a primary Central Processing Unit (CPU) of the gaming machine and the DSP. Under such an arrangement, the DSP is able to process one or more inputs and provide one or more outputs, but is unable to communicate directly with the CPU.

According to a preferred embodiment of the present invention, the provided apparatus and method involve the use of a DSP within a contained sound system to generate and control audio signals in a gaming machine. A CPU and a PLD are also utilized in conjunction with the DSP. In addition, one or more memory storage devices are provided in conjunction with the DSP, the CPU, or both. In a particularly preferred embodiment, a digital-to-analog converter provides output to one or more speakers, while an analog-to-digital converter relays input from one or more microphones within the sound system. Video and other uses for such a DSP within a gaming machine are contemplated by the present invention as well.

Other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes only and merely serve to provide examples of possible structures and process steps for the disclosed inventive use of a DSP to generate and control electronic signals in a gaming machine. These drawings in no way limit any changes in form and detail that may be made to the invention by one skilled in the art without departing from the spirit and scope of the invention.

DETAILED DESCRIPTION

Figure 1:
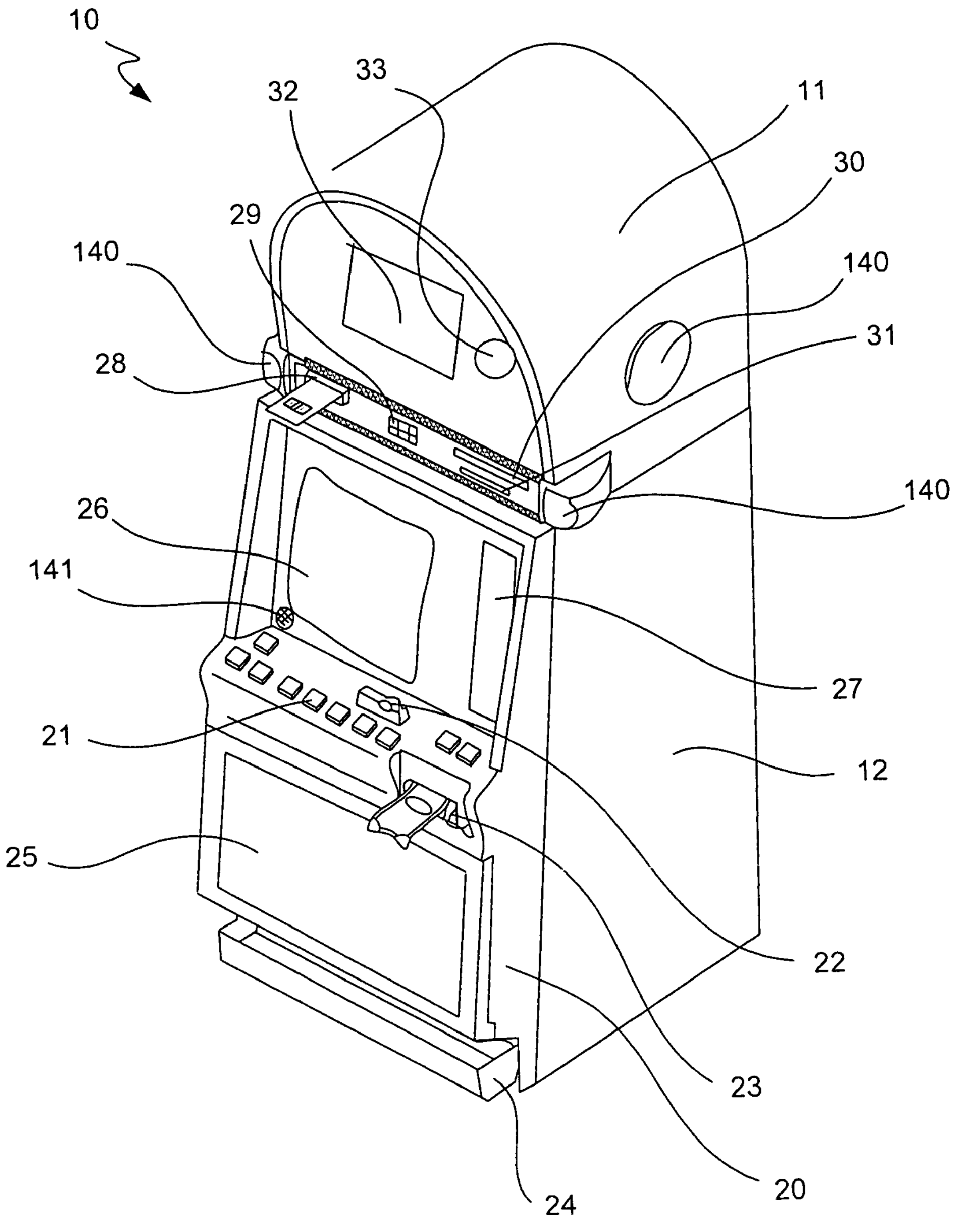
FIG. 1 illustrates in perspective view an exemplary gaming machine.

An example application of an apparatus and method according to the present invention is described in this section. This example is being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

One advantage of the present invention is the provision of improved apparatuses and methods for generating and controlling electronic signals in a gaming machine, such that the sound, video, and/or other qualities and functionalities of the gaming machine sound system are dramatically improved. This is accomplished through the use of a DSP that is utilized to substantially the full extent of its many capabilities. Such use of a DSP is made feasible due to its relative isolation from the CPU of the gaming machine, whereby the various concerns and potential objections of gaming regulators and jurisdictions are satisfied and for the most part preempted. Another advantage of the present invention is the substantial reduction in the amounts of memory storage required by typical gaming machine sound and video systems, which generally do not include the use of DSPs or other intelligent auxiliary processors, with the resulting reduction in costs.

Because casinos and gaming machine manufacturers are restricted by various gaming regulators and concerns regarding gaming machines and gaming machine designs, as detailed above, gaming machines, and particularly gaming machine sound systems, comprise an ideal illustrative example for the types of inventive machine operable electronic systems disclosed herein. Although the discussion and illustrative examples disclosed herein are thus directed primarily toward gaming machine sound systems as a matter of convenience, it should be borne in mind that such sound systems, as well as the inventive apparatuses and methods disclosed and claimed herein, are readily applicable to other types of electronic devices and machines. Likewise, the inventive apparatuses and methods disclosed and claimed herein are also extendable to video systems and other electronic media systems that make use of DSPs and/or other intelligent auxiliary processors.

Continuing with the illustrative example of a sound system within a gaming machine, an exemplary gaming machine is illustrated in perspective view in FIG. 1. Gaming machine 10 includes a top box 11 and a main cabinet 12, which generally surrounds the machine interior (not shown) and is viewable by users. Main cabinet 12 includes a main door 20 on the front of the machine, which opens to provide access to the interior of the machine. Attached to the main door are typically one or more player-input switches or buttons 21, one or more money or credit acceptors, such as a coin acceptor 22, and a bill or ticket validator 23, a coin tray 24, and a belly glass 25. Viewable through main door 20 is a primary video display monitor 26 and one or more information panels 27. The primary video display monitor 26 will typically be a cathode ray tube, high resolution flat-panel LCD, plasma/LED display or other conventional electronically controlled video monitor. Main cabinet 12 also typically includes one or more access panels (not shown) in the back of the machine. Top box 11, which typically rests atop of the main cabinet 12, may also contain a bill or ticket validator 28, a key pad 29, one or more additional displays 30, a card reader 31, and a secondary video display monitor 32, which may also be a cathode ray tube, high resolution flat-panel LCD, plasma/LED display or other conventional electronically controlled video monitor.

Top box 11 may also include one or more cameras 33 installed to generate player images that are integrated into a virtual gaming environment implemented on the gaming machine. Such a use and description for a camera within a gaming machine is disclosed in commonly assigned and co-pending U.S. patent application Ser. No. 09/927,901, by LeMay et al. filed on Aug. 9, 2001, and titled "Virtual Cameras and 3-D Gaming Environments in a Gaming Machine," which application is incorporated herein in its entirety and for all purposes. Similar methods and apparatuses for capturing the image of a player or user to a video frame are also described in commonly assigned and co-pending U.S. patent application Ser. No. 09/689,498, by LeMay et al. filed on Oct. 11, 2000, and titled "Frame Buffer Capture of Actual Game Play," which application is also incorporated herein in its entirety and for all purposes.

Gaming machine 10 may also include a sound system with several components residing both internally and on the exterior of the machine. Such components can include one or more speakers 140 and one or more microphones 141. While FIG. 1 depicts three speakers 140 located on the exterior of top box 11 and one microphone located on the exterior of main door 20 on main cabinet 12, alternative embodiments having differing locations and different numbers of speakers and/or microphones are also contemplated. For example, one or more microphones may be located on the top box, while one or more speakers may be located on the main cabinet; alternatively, one or more speakers and/or microphones may be located within the gaming machine as well.

Figure 2:
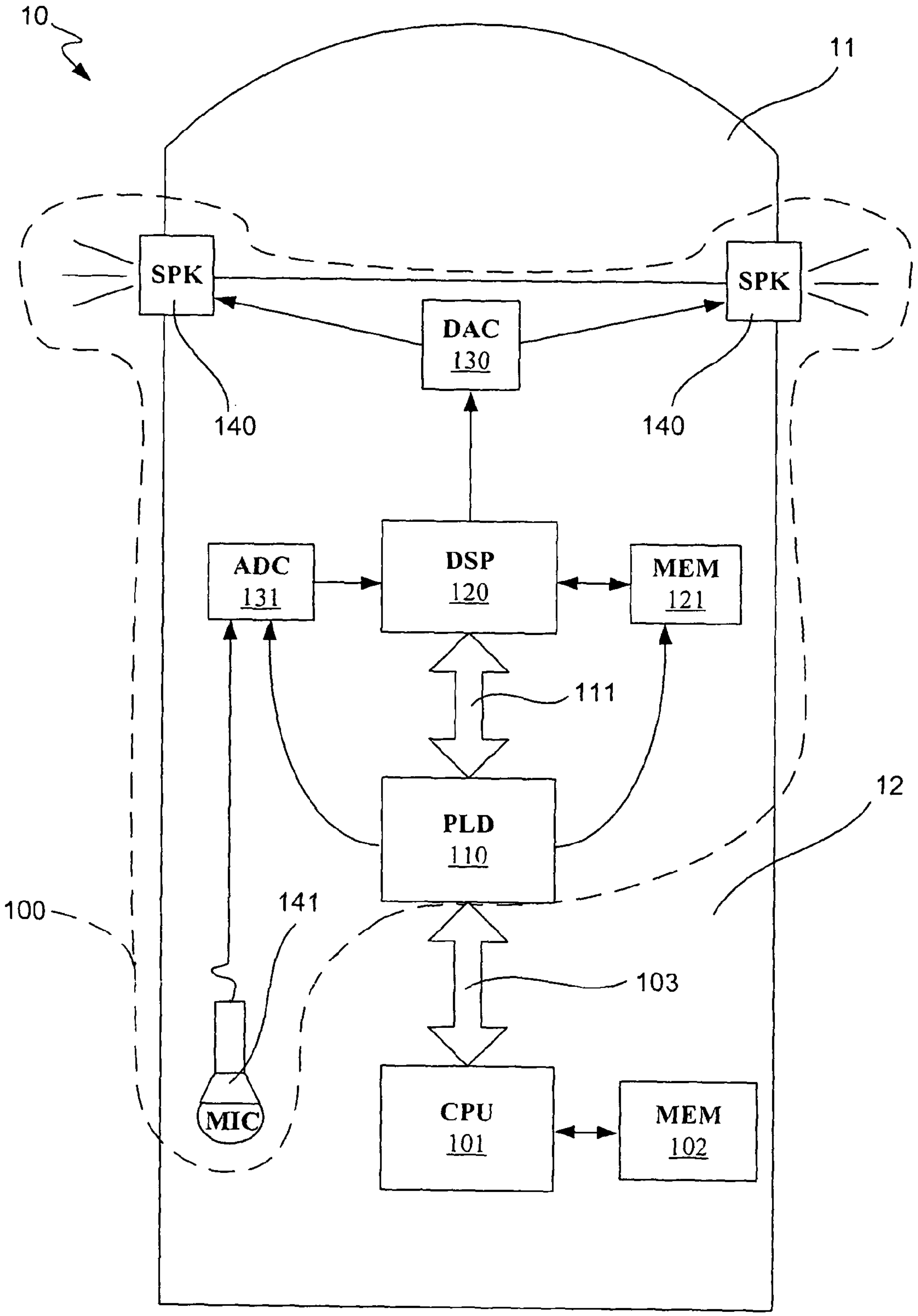
FIG. 2 illustrates a block diagram of a particular electronic component infrastructure for generating and controlling audio signals in a gaming machine according to a preferred embodiment of the present invention.

Turning now to FIG. 2, an exemplary block diagram of a particular electronic component infrastructure for generating and controlling audio signals in a gaming machine according to a preferred embodiment of the present invention is illustrated. Gaming machine 10 generally comprises a top box 11 and main cabinet 12 and, similarly to FIG. 1, while all electronic components in FIG. 2 are shown to be at least partially within main cabinet 12 for purposes of illustration, all other embodiments having differing locations (e.g., within the top box or outside the machine) for one or more of these electronic components are also contemplated. For example, most or all of the electronic components may alternatively reside within the top box 11, particularly those components within sound system 100.

Sound system 100, which generally resides within and/or about gaming machine 10, comprises a plurality of components, each of which are separate and distinct from the master gaming controller, or primary CPU 101. Such a primary CPU can be, for example, a model i960 type of CPU, manufactured by Intel Corporation of Santa Clara, Calif., which model is present in many IGT machines, such as many of those under the Game King and Vision labels, as well as various other electronic gaming machines. In fact, i960 type and similar types and variations of primary CPUs are present in many types of electronic gaming machines, and inclusion of not only i960s but all types and variations of primary CPUs are contemplated for use in the present invention. CPU 101 is generally responsible for controlling and/or processing all elements of game play, money or credit intake, payouts, any network communications (if applicable), and other machine functions, as is generally known in the art. CPU 101 is also associated with and connected to one or more memory units 102, which memory units may comprise ROM, RAM, any other type or types of memory, or any combination thereof. In addition, one or more memory units 102 may reside directly in or on CPU 101, or may be separate and connected to the CPU, as desired.

According to a preferred embodiment of the present invention, at least one connection or bus 103 is used to provide direct communications between CPU 101 and at least one PLD 110 within sound system 100. Such a bus 103 is preferably configured Such that data bits can be sent back and forth between the CPU and PLD, and control and address bits can be communicated in one direction only, from the CPU to the PLD. Bus 103 is also preferably configured Such that control and address bits cannot be communicated to the CPU from the PLD, thereby preserving the integrity of communications and information that can possibly be input into the CPU as a result of any activities of the PLD or any other device beyond the PLD. At least one two-way connection or bus 111 then corrects PLD 10 with DSP 120, such that both of these units are able to send a full range of commands and communications to each other. In this manner, the DSP is relatively isolated from the CPU, such that it does not receive any communications or instructions directly from the CPU, can only send information or bits to be passed to the CPU along a data bit line, and cannot send any firm communication or instruction that will ever reach the CPU in a significant capacity while sound system 100 is in the configuration as illustrated. Accordingly, it is believed that any concerns or reservations that may be had by gaming authorities regarding multiple processors in one gaming machine should be readily mollified.

As set forth above, at least one PLD 110 comprises at least one entry point for input into the actual sound system 100. PLD 110, which can be, for example, a model XC9528SXL PLD, manufactured by Xilinx, Inc. of San Jose, Calif., generally comprises at least one relatively "non-intelligent" programmable logic device capable of receiving directions from one or more processors and aiding in the performance or forwarding of those directions. As is generally understood by those skilled in the art, such activity typically involves the reception of one or more high level commands (e.g., "Play Song A") from a CPU or other intelligent processor by the PLD. Then, according to preprogrammed instructions with respect to any particular high level command, the PLD sets forth the types and order of discrete events necessary to resolve a particular high level command, and performs or instructs other system components to perform each of these discrete events as necessary. Accordingly, PLD 110 preferably comprises at least one event sequencer and at least one address decoder, which components may actually reside on two separate PLDs, or one integrated PLD, as desired. As will be generally understood by those skilled in the art, such an event sequencer is primarily used to set forth the precise order of discrete events to be performed, while the address decoder is primarily used to aid in retrieving files from particular locations in one or more stored memory units, which memory units may be associated with the CPU, the DSP, or some other component within the gaming machine.

While PLD 110 is configured to be in communication with several components of sound system 100, its primary function is to buffer, interact with and optimize DSP 120 by taking care of tasks that are relatively mundane with respect to those that can be accomplished by the DSP. Although varying degrees of specificity may exist for labeling a particular chip or hardware component, for the purposes disclosed herein, a DSP is generally defined as a microprocessor that is used to perform mathematical calculations: (1) on data from an existing sound, video, or other media file to alter the sound, video or other media, and/or (2) to generate a stream of digital sound, video, or other media data without an existing sound, video, or other media file. Such a microprocessor need not be labeled as a “DSP” chip to be considered a DSP under the foregoing definition, and it is particularly preferable and contemplated that such a DSP be programmable in at least one language capable of expressing digital signal processing mathematical equations. It is also particularly preferable and contemplated that such a DSP be capable of performing those same or similar digital signal processing mathematical calculations on a digital sound, video, or other media data stream.

Figure 3:
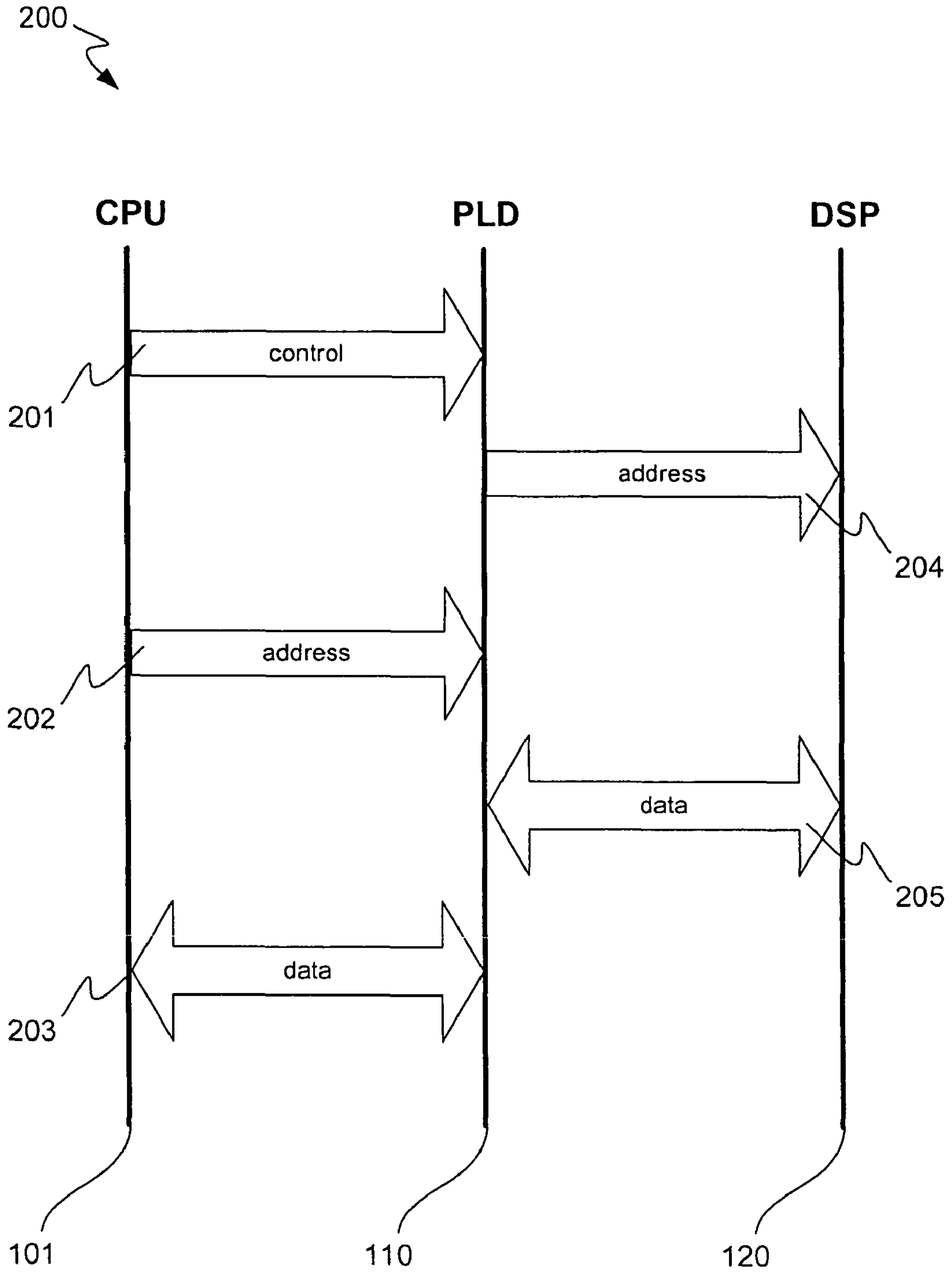
FIG. 3 illustrates a block diagram of a particular CPU to PLD to DSP communication configuration according to a preferred embodiment of the present invention.

Referring now to FIG. 3 for the specific purpose of discussing details of the communication relationships between the CPU, PLD and DSP, an exemplary block diagram of a particular CPU to PLD to DSP communication configuration according to a preferred embodiment of the present invention is illustrated. Communication configuration 200 comprises CPU 101 having at least three modes of communication with PLD 110, which in turn has at least two modes of communication with DSP 120. In sending information to the PLD, the CPU can utilize one or more communication lines, which preferably comprise at least one control line 201, one address line 202 and one data line 203, although more than one of each type of line is also possible. In a particularly preferred embodiment, each control line 201 comprises an 8-bit line, each address line 202 comprises a 24-bit line, and each data line 203 comprises a 16-bit line, although other lines, line sizes and bandwidths are also contemplated. As will be readily understood by those skilled in the art, a control line 201 can be ordinarily used in a clocking or other similar synchronization capacity, while an address line 202 can be ordinarily used for having the CPU direct the PLD to perform or accomplish various functions or commands, and/or to provide information on where particular files are stored in various memory locations. Similarly, one or more data lines 203 can be ordinarily used for transmitting actual data bits from the CPU to the PLD, or from the PLD to the CPU.

As disclosed previously, any and all control and address lines are preferably configured such that information can only be sent from the CPU to the PLD, thereby rendering the PLD unable to send or transmit any communication or bits to the CPU on any of these communication lines. Only data lines can utilized as two-way communication lines, whereby data bits may be sent in both directions. Access from the PLD to the CPU via one or more data lines 203 is preferably restricted, however, in that data cannot be sent into the CPU from the PLD unless the CPU has specifically asked for data and has adjusted a corresponding state condition of a specific data line or “select line” such that data can be transmitted into the CPU along that select line. Such uses of select lines and state conditions to restrict the transmission of data are well known to those skilled in the art, and all variations of such uses and techniques are contemplated for use with the present invention.

Accordingly, the PLD cannot issue commands or even initiate communication with the CPU, but can only respond to and interact with the CPU per invitation from the CPU itself. In this manner, any potential hack or tampering with only the PLD and/or DSP cannot result in any meaningful alteration or manipulation of the CPU. Should such an attempt take place, the worst-case scenario would merely be the introduction of non-intelligible data bits into the CPU where the CPU was looking for data only. In one embodiment of the present invention, the only data that can be requested by and purportedly transmitted into the CPU is wave file data and status information. Accordingly, a request for data by the CPU that results in an open select line can only result in the inputting of information from the PLD that would purportedly match the format of a wave file or a status update. Should a hack be attempted across the open selected data line, the inputted bits would merely resemble gobbledygook data, and could not be used to control or manipulate the CPU.

In communicating with the DSP 120 in turn, the PLD 110 can similarly utilize one or more communication lines, which preferably comprise at least an address line 204, and a data line 205, with ordinary functionalities similar to those described above. As disclosed previously, these lines may be configured such that information can be sent from the PLD to the DSP, or from the DSP to the PLD. In a particularly preferred embodiment, address line 204 comprises a 32-bit line that only allows transmission from the PLD to the DSP, while data line 205 comprises a 24-bit line that allows transmissions in both directions, although other lines, line sizes, bandwidths and transmission directions are also contemplated.

Returning again to FIG. 2, DSP 120 and the remainder of sound system 100 is hereby set forth and discussed in greater detail. DSP 120 may comprise, for example, a model ADSP-21161, 32-bit floating-point processor chip, capable of core speeds up to 100 MHz, which is also manufactured by Analog Devices Inc. This DSP 120 can execute instructions and perform operations using either its internal memory, or from one or more associated external memory units 121, which memory units may comprise ROM, RAM, any other type or types of memory, or any combination thereof. Memory 121 comprises various types of sound files, profiles, styles and other data stored in various electronic formats, as desired. Simple and straightforward wave files, for example, can reside on memory 121, as well as more complex wave tables and file formats such as MP3, Vorbis, and any other advanced audio file format, as desired.

In addition to having a two-way (i.e. read-write capable) connection with external memory 121, DSP 120 is also preferably connected to one or more output speakers 140 via a digital-to-analog converter (DAC) 130 and to one or more input microphones 141 via an analog-to-digital converter (ADC) 131. While DAC 130 may comprise, for example, a model CS4340 DAC and ADC 131 may comprise, for example, a model CS5333 ADC, both manufactured by Cirrus Logic, Inc. of Austin, Tex., any and all such commonly adaptable DACs and ADCs are contemplated for use in conjunction with the present invention. It should also be borne in mind that while it may be preferable for communication is to generally flow from a microphone into an ADC and then into the DSP, and from the DSP into a DAC and then into a speaker, it is also contemplated that communications also be possible in the reverse directions along these lines, if desired. In addition, while PLD 110 is primarily configured to send and receive communications from DSP 120, it is also preferable that this PLD be able to communicate directly with one or more external memory units 121 and one or more ADCs 131, such that the PLD can further optimize the DSP by directly accessing, sending commands, or otherwise interacting with these components in instances when DSP interaction is not necessary.

By utilizing a DSP in a sound system in the manner detailed above, many limitations of prior art gaming machine sound systems are overcome, as any sound can theoretically be generated by creating and using the necessary algorithm or function running within the DSP. The end result is that a user is not limited to a specific, bounded range of sound files, tones, rhythms, or set of instruments. Instead, use of a DSP enables more advanced sounds and alternative instruments that can be more easily emulated and modulated, as well as a wide variety of mixing, time-modulating and synthesizing functionalities. Rather than being stored uncompressed and in their entirety, sound files can be stored in a variety of compressed, altered and truncated formats, with playback using a DSP being straightforward, or through the implementation of real-time synthesizing and/or mixing during playback, as desired. Accordingly, a significant savings in the amount of memory storage, and associated costs, as well as a significantly increased variety in the quantity and quality of available sounds and audio capabilities can be realized through use of the sound system disclosed herein.

As will be readily understood by those skilled in the art, use of a DSP within a sound system enables the use of sound files, functions and capabilities that extend well beyond the use of uncompressed wave files. While such wave files are simple recordings that are merely played back, which simple functionality is also possible through use of a DSP, a fully utilized DSP is also capable of performing mixing, decompressing (if compressed files are used), synthesizing, and other functions on a wave file during playback. In addition, a DSP is also capable of providing a variety of other capabilities, such as pure sound synthesis, wherein sounds are wholly and originally created by the DSP itself. Such a pure sound synthesis involves the use of mathematical functions and principles to create original sounds and songs, with sound elements such as pitch, duration, attack, sustain and decay, among others, being determined by the DSP itself during the actual sound synthesis. Such elements may be determined randomly according to set programs within the DSP, or with some guidance or preferences from user set parameters and controls, as will be readily understood by those skilled in the art.

In addition to pure sound synthesis, wave table synthesis can also be performed through use of the DSP. Such functionality typically includes the storing of fragments of sound such as an individual note into memory, whereupon the DSP can readily access one or more sound fragments. Stored fragments in a wave table can have one or more parameters, such as pitch, duration, attack, sustain, decay, etc., which parameters are read and utilized by the DSP when calling up the stored sound fragment in real time during the creation of an audio stream. Types of sounds that can be stored include, for example, individual notes from any type of musical instrument, individual drum beats, vocal clips, sound effects, random noises and any other sounds that a machine operator may desire to be stored. In this manner, sound can be originally created through the use of only sound fragments and bits, and without the use of lengthy sound files stored to memory, although use of sound files, and especially compressed sound files, is specifically contemplated by the present invention as well.

While the DSP may be used to merely play back a sound file, as disclosed previously, it is preferable that the DSP also be utilized so as to mix and/or synthesize the sound on one or more sound files in real time during playback. Such deliberate alterations of the sound from the recorded sound file can include changes to one or more musical and tonal parameters, with various sound elements such as the pitch, duration, attack, sustain and decay of one or more sounds being altered in real time to produce a final sound that is noticeably different that the one that is actually recorded on the sound file itself. While alterations to the recorded sound can be made in real time during playback, such alterations can also be made in batches, or even completely in advance, as desired. Such playback alterations and modifications can be made from both fully stored and compressed sound files.

One type of file compression and playback from a compressed sound file is commonly known as "data compression," whereby a file is made smaller to save space by utilizing an encoder. When such a data compressed file is played back, the DSP is used in a "data decompression" capacity to decode the compressed data to reproduce, as faithfully as possible, the original file as it was before it was encoded and compressed. Another type of file playback is commonly referred to as "dynamics compression," whereby an original file remains unaffected, such that no encoding or other process is performed upon the file before storage. When a file is played back with a DSP under a dynamics compression process, the overall volume (i.e., "gain") is varied in real time based on one or more parameters or items of information, such as the amplitude or loudness, for example. This acts to alter the volume in real time to affect the playback by, for example, making loud passages still louder and soft passages still softer, or vice versa, as desired.

Such a "dynamics compression" is just one other way of altering or modifying a sound file during playback through use of a DSP. Additional types of alterations to one or more compressed or uncompressed recorded sound files by using a DSP during playback also include varying treble and bass controls, ring modulator functions, "vocoder" functions, and any other function that deliberately changes one or more sound parameters to create a desired effect, as will be readily understood by those skilled in the art. These and other common types and ways of utilizing a DSP to produce real time, batched, or advance sound modifications to one or more existing sound files either before or during playback are also possible, and all such possible modifications are also contemplated by the present invention.

Another advantage of utilizing a DSP in the foregoing manner is that the use of any special purpose dedicated sound chips, components or other hardware is minimized or eliminated altogether. By having a programmable DSP that can perform sound synthesis by itself, sound synthesis functionalities can be modified or upgraded via software, rather than hardware, when new functions or programs are desired. Accordingly, the replacement of typically non-reconfigurable sound chips or other hardware is obviated, and a system designer is granted more flexibility in choosing and implementing synthesis algorithms, knowing that the DSP can simply be reprogrammed or augmented with upgraded software in the future.

One desirable artifact of utilizing compressed sound files is that sound files for interactive games can be more readily stored in a plurality of languages, accents, genders, styles and the like. A player can then be given the option of selecting, for example, a language with which the player is most comfortable, such that all instructions, game play expressions, exclamations and the like can be expressed from the machine in the player's selected language. The sounds played by the machine can thus be based upon a reconfigurable data set that is selected by the player, the machine, stored data, casino personnel, or some combination thereof. Such selections can be made both before and during game play. For example, a Player Tracking system installed in the machine can configure the audio system for a particular player based upon information unique to that player, which information has been input by that player or, alternatively, has been stored on a Player Tracking Card for that player. Such input could be made by interactive buttons, one or more microphones coupled with a speech recognition program, or any other convenient input means, as desired.

Use of a DSP also permits the mixing of various prerecorded and digitized sounds with other such sounds, and/or with other sound sources. Such sound mixing, which has been heretofore intensive and difficult in existing gaming machine sound systems, can also be done with a particular emphasis or de-emphasis on one or more of the mixed sound sources. For example, a particular voice track can be played at an emphasized level, while background music or sounds are de-emphasized, and such a background music or track can then be emphasized after a voice-over is complete, or a particular sequence in the background sound is reached, for example. In this manner, the overall sound level can remain the same while one or more particular sound channels are emphasized or de-emphasized over others. As in the foregoing example, a selected preference as to which sound tracks or voice tracks are to be emphasized over others can be made automatically by the machine, via player or other user input, or by some combination of the two.

According to a preferred embodiment of the present invention, automatic gain control and/or active ambient noise filtering could be adjusted in real time through use of the DSP, as desired. Under such all arrangement, added game features can include the active recording and playback of voices and sounds from not only active players themselves, but also of past players and ambient noise around the machine. Such recordings could be preset, such as those recorded onto a Player Tracking card or other type of smart card that could be input into the gaming machine or, alternatively, could be made from one or more machine prompted enunciations of player information, such as a player's name, "handle" or personalized "style." Such recordings could also be impromptu, such as one or more audible reactions of a player or a group of people around the machine after a big win or frustratingly close loss. Such recordings could be made via one or more microphones placed in or about the machine, which record sounds at one or more selected times built into the program, or altered as desired.

In addition to straightforward sound files, clips and streams, various comprehensive audio themes, profiles or styles may be present within the gaming machine and available to the DSP based sound system. Such "styles," which are preferably stored within DSP accessible memory and implemented via the DSP, comprise a defined grouping or series of audio files, clips, accents, parameters, and/or preferences, such that a recognizable character or theme can be expressed via machine emitted sounds before, during and after game play. Such styles can include, for example, a "John Wayne" style, a "Joan Rivers" style, an "Elvis" style, a "Wheel of Fortune" style, and others. An Elvis "style" could include, for example, recognizably accented audio clips such as "Don't be cruel" before game play, "Viva Las Vegas" after a big win, "Return to sender" after an even money payout, and "Thank you . . . thankyouverahmuch" after game play has definitively ended, among others. Such a sound expressed "style" can also be accompanied by additional compatible screen displayed icons or figures, as well as an overall game look and feel, such as permanent pictures or graphics on, for example, the belly glass, information panels or top box.

In addition to the foregoing functionalities and features, other game play features for use in conjunction with a DSP are also contemplated. Examples of such additional features include the synchronization of game play or bonus device movement to sound, and the implementation of additional audio themes, profiles or styles that can be added via manual input either by casino personnel, or by a player by hand or via a Player Tracking Card, for example.

It is specifically contemplated that the sound system disclosed and detailed above can be utilized not only in newly manufactured gaming machines and other electronic components, but can also be implemented into existing gaming machines and other devices by removing some or all of the sound systems that exist in those machines. For example, while one or more original speakers, microphones, DACs, and/or ADCs may remain in a given machine, it is contemplated that at least the inventive PLD-DSP-external memory combination be inserted as a unit to replace any existing analogous sound system components in an existing machine. For example, it is known that the DSP-PLD and associated circuitry, as disclosed above, can replace approximately five separate sound-system-related integrated circuits in current i960 based gaming machine products that are currently on the market.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A wager-based gaming machine comprising:

one or more speakers;

a master gaming controller adapted to process and facilitate the presentation of a wager-based game;

a digital sound system comprising:

at least one memory unit storing data, wherein said data comprises one or more wave files, one or more sets of wave table data, or both, and a digital signal processor configured to produce audio output for said one or more speakers, wherein said digital signal processor is adapted to perform at least one function selected from the group consisting of generating original audio output and modifying existing sound files;

a programmable logic device interposed between the master gaming controller and the digital sound system and wherein said programmable logic device converts instructions from said master gaming controller to instructions that can be executed by said digital signal processor, and said programmable logic device and said master gaming controller are communicatively coupled by a control line, an address line, and a data line, said control line and said address line configured such that information can only be sent from the master gaming controller to the programmable logic device, and said data line configured such that data bits may be sent in both directions.

2. The gaming machine of claim 1, wherein the programmable logic device forms an event sequencer interposed between the master gaming controller and the digital signal processor.

3. The gaming machine of claim 1, wherein said digital signal processor is configured to alter musical or tonal parameters while a sound file is playing.

4. The gaming machine of claim 1, wherein said digital signal processor is configured to synthesize music in real-time.

5. The gaming machine of claim 1, wherein said digital signal processor is configured to provide audio output tailored to a player currently using the gaming machine.

6. The gaming machine of claim 4, wherein said audio output is tailored by at least one or more parameters selected from the group consisting of language selection, gender selection, accent selection, and style selection.

7. The gaming machine of claim 1, wherein said digital signal processor is configured to recognize speech used by a player at or near the gaming machine.

8. The gaming machine of claim 1, wherein said digital sound system further comprises a microphone, as well as speech recognition logic implemented on the digital signal processor.

9. The gaming machine of claim 1, wherein said digital sound system comprises additional memory for storing audio processing algorithms for execution on the digital signal processor.

10. The gaming machine of claim 2, wherein said event sequencer is installed in a manner that prevents the digital signal processor from effecting operation of the master gaming controller.

11. A wager-based gaming machine, comprising:

a central processing unit adapted to process and facilitate the presentation of a wager-based game;

a programmable logic device separate from and connected to said central processing unit; and a digital signal processor adapted to generate and control digital output, said digital signal processor being separate from and connected to said programmable logic device, wherein said programmable logic device is interposed between said central processing unit and said digital signal processor, wherein said programmable logic device converts instructions from said central processing unit to instructions that can be executed by said digital signal processor, and said programmable logic device and said central processing unit are communicatively coupled by a control line, an address line, and a data line, said control line and said address line configured such that information can only be sent from the central processing unit to the programmable logic device, and said data line configured such that data bits may be sent in both directions.

12. The wager-based gaming machine of claim 11, wherein said digital signal processor is adapted to generate and control audio output for one or more speakers.

13. The wager-based gaming machine of claim 12, wherein said digital signal processor is configured to alter musical or tonal parameters while a sound file is playing.

14. The wager-based gaming machine of claim 12, wherein the digital signal processor is configured to provide audio output tailored to a current user of the device.

15. The wager-based gaming machine of claim 11, wherein said programmable logic device comprises an event sequencer.

16. The wager-based gaming machine of claim 11, wherein said central processing unit comprises a master gaming controller.

17. A method of providing sound in a wager-based gaming machine, comprising:

receiving, at a programmable logic device, CPU instructions from a central processing unit, said central processing unit being configured to process and facilitate presentation of a wager-based game;

converting said CPU instructions to DSP instructions that can be executed by a digital signal processor;

generating and controlling audio output for one or more speakers, responsive to the DSP instructions, with the digital signal processor, said digital signal processor being separate from and connected to said programmable logic device, the programmable logic device being separate from and connected to the central processing unit;

wherein said programmable logic device is interposed between said central processing unit and said digital signal processor; and said programmable logic device and said central processing unit are communicatively coupled by a control line, an address line, and a data line, said control line and said address line configured such that information can only be sent from the central processing unit to the programmable logic device, and said data line configured such that data bits may be sent in both directions.

18. The method of claim 17, wherein the digital signal processor is configured to provide audio output tailored to a current user of the wager-based gaming machine.

19. The method of claim 17, wherein said programmable logic device comprises an event sequencer.

20. The method of claim 17, wherein said central processing unit comprises a master gaming controller.

21. The gaming machine of claim 11, wherein said digital signal processor is configured to synthesize music in real-time.

22. The gaming machine of claim 21, wherein said digital output is tailored by at least one or more parameters selected from the group consisting of language selection, gender selection, accent selection, and style selection.

23. The gaming machine of claim 11, wherein said digital signal processor is configured to recognize speech used by a player at or near the gaming machine.

24. The gaming machine of claim 11, further comprising (i) a microphone, and (ii) speech recognition logic implemented on the digital signal processor.

25. The gaming machine of claim 11, further comprising additional memory for storing audio processing algorithms for execution on the digital signal processor.

26. The gaming machine of claim 15, wherein said event sequencer is installed in a manner that prevents the digital signal processor from effecting operation of the master gaming controller.

* * * * *